United States Patent [19]
Ingram et al.

[11] Patent Number: 5,428,404
[45] Date of Patent: Jun. 27, 1995

[54] APPARATUS FOR METHOD FOR SELECTIVELY DEMODULATING AND REMODULATING ALTERNATE CHANNELS OF A TELEVISION BROADCAST

[75] Inventors: Eric J. Ingram; James O. Farmer, both of Lilburn, Ga.

[73] Assignee: Scientific-Atlanta, Inc., Atlanta, Ga.

[21] Appl. No.: 10,771

[22] Filed: Jan. 29, 1993

[51] Int. Cl.⁶ .................. H04N 5/40; H04N 5/455
[52] U.S. Cl. .................. 348/726; 348/738; 348/724; 329/337; 332/136
[58] Field of Search ............... 358/188, 189, 198, 196, 358/197, 191.1, 86, 84, 143, 144, 145, 142, 186; 329/337, 350; 381/6, 7, 8, 9, 3, 4, 27, 106; 328/140; 307/521, 19, 20; 455/42, 337; H04N 7/04, 5/40, 5/60; 332/117 R, 119, 135, 136

[56] References Cited

U.S. PATENT DOCUMENTS

| | | | |
|---|---|---|---|
| 3,611,195 | 10/1971 | Parham | 332/117 R |
| 4,048,654 | 9/1977 | Wegner | 358/144 |
| 4,139,866 | 2/1979 | Wegner | 358/198 |
| 4,399,329 | 8/1983 | Wharton | 358/144 |
| 4,461,021 | 7/1984 | Schwarz et al. | 358/198 |
| 4,486,897 | 12/1984 | Nagai | 381/2 |
| 4,490,680 | 12/1984 | Goto | 329/337 |
| 4,523,151 | 6/1985 | Bauerschmidt | 329/326 |
| 4,536,798 | 8/1985 | Reid et al. | 358/197 |
| 4,555,730 | 11/1985 | Briggs | 358/143 |
| 4,562,404 | 12/1985 | Futakuchi | 329/328 |
| 4,620,226 | 10/1986 | Cheung | 358/143 |
| 4,716,529 | 12/1987 | Matui | 358/144 |
| 4,739,407 | 4/1988 | Mack et al. | 358/188 |
| 4,748,501 | 5/1988 | Long | 598/198 |
| 4,847,700 | 7/1989 | Freeman | 358/143 |
| 4,956,862 | 9/1990 | Robbins et al. | 358/144 |
| 5,034,994 | 7/1991 | Muterspaugh et al. | 358/191.1 |
| 5,047,860 | 9/1991 | Rogalski | 358/188 |

FOREIGN PATENT DOCUMENTS

0519667A1 12/1992 European Pat. Off. ....... H04N 7/10

OTHER PUBLICATIONS

Excerpts from Report on Television Dual Sound Broadcasting Method (Best Available Copy).
Excerpts from Dual Sound Report, in Korean; Figures provided in English (Best Available Copy).
Excerpts from C. Eilers, TV Multichannel Sound–The BTSC System, IEEE Trans. on Consumer Electronics, February, 1985, vol. CE-31, No. 1, pp. 1–7.

*Primary Examiner*—James J. Groody
*Assistant Examiner*—Michael H. Lee
*Attorney, Agent, or Firm*—Banner, Birch, McKie & Beckett

[57] ABSTRACT

An apparatus and method for demodulating and remodulating a transmitted signal prior to presentation to a television receiver, the transmitted signal comprising a video signal, a first channel signal, and a second channel signal, wherein one of the two channel signals is selected, demodulated and remodulated with the video signal prior to presentation to the television receiver. The apparatus allows the viewer of a television receiver which accepts a single channel signal to select between one of two alternate channel signals associated with a video broadcast without the need to modify the television receiver. The apparatus is particularly well suited for television broadcasts using a dual carrier transmission format. A novel varactor diode tuning means is used in one embodiment for changing the center frequency of a frequency modulation demodulator. The disclosed apparatus also transparently allows stereo demodulation for television receivers which are capable of such stereo demodulation.

31 Claims, 10 Drawing Sheets

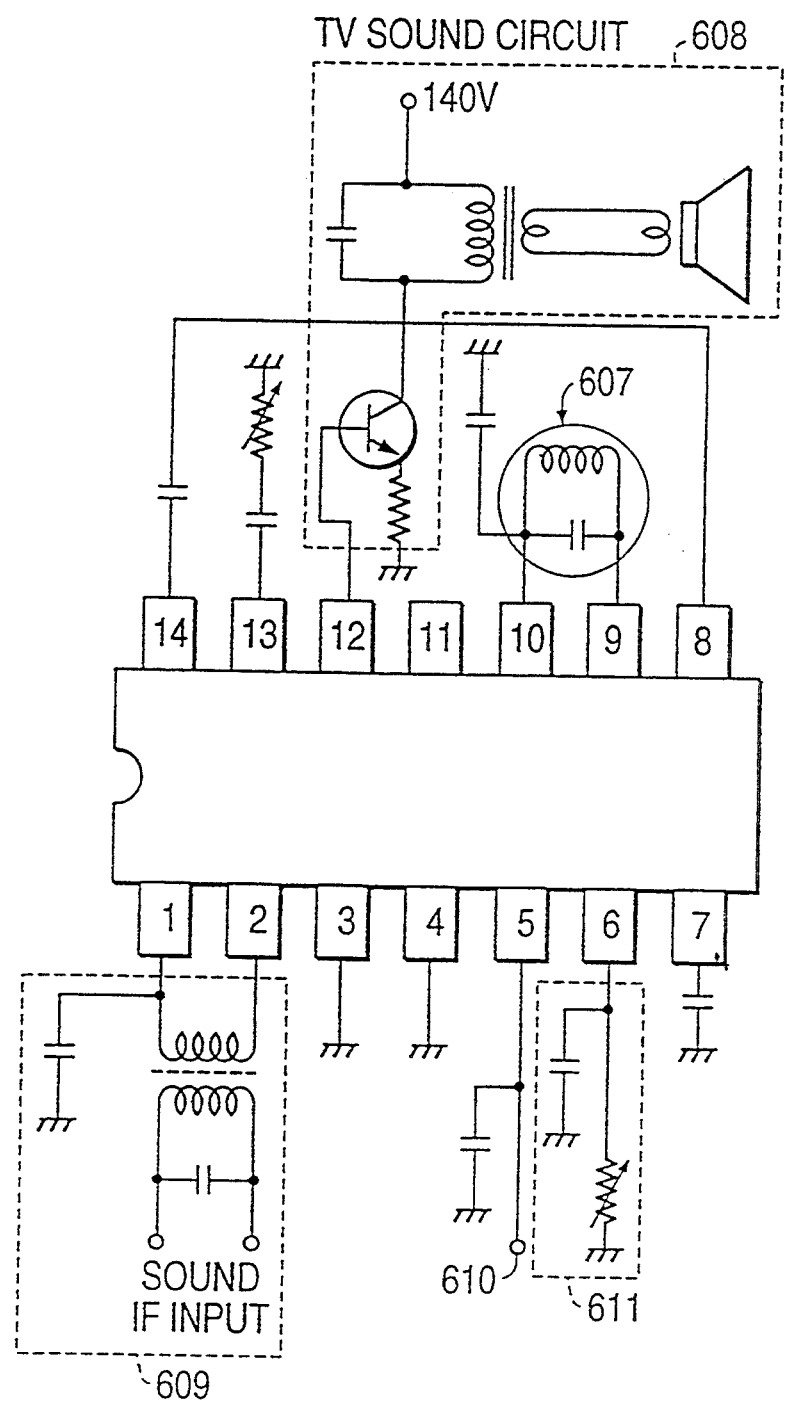

APPARATUS FOR METHOD FOR SELECTIVELY DEMODULATING AND REMODULATING ALTERNATE CHANNELS OF A TELEVISION BROADCAST

BACKGROUND OF THE INVENTION

1. Technical Field

This invention relates generally to a television receiving apparatus and, more particularly, is directed to an apparatus for selecting, demodulating and remodulating a signal accompanying a video signal in a television broadcast.

2. Related Information

Broadcast television signals typically comprise a video signal and at least one audio signal which may be a stereo audio signal comprising left and right speaker signals. The term "broadcast" hereinafter refers to the transmission of a video signal and audio signals or other secondary information accompanying the video signal, whether originating at the source of the video signal or not. This definition would include, for example, television signals transmitted by conventional radiated propagation, by cable transmission, or by direct satellite transmission. It would also include transmissions in which a cable operator adds secondary information, in the form of audio data or otherwise, to a video signal and transmits the combination.

In general, a television signal has a video carrier and a sound carrier to transmit the picture and sound, respectively. For stereo television broadcasts, the United States television industry uses a format (arrangement of video and audio signals in a frequency spectrum) for transmitting stereo called MTS (Multichannel Television Sound), sometimes referred to as BTSC (for Broadcast Television System Committee). This format is discussed in C. Eilers, Television Multichannel Sound—The BTSC System, *IEEE Transactions on Consumer Electronics*, February 1983, Vol. CE-31, No. 1, incorporated herein by reference.

The MTS signal, illustrated in FIG. 1(a), transmits stereo audio as a multiplex of two signals. The sum of the left and right audio channels (L+R) has a bandwidth of 15 KHz and frequency modulates a sound carrier. This L+R signal is compatible with all existing monaural television receivers, which have audio channel low-pass filter roll-off above 15 KHz and are not affected by the remaining portions of the signal described below. A stereo difference signal (L−R), which also has an audio bandwidth of 15 KHz, exists as an amplitude-modulated double-sideband suppressed-carrier (DSB-SC) signal centered at 31.468 KHz (two times the horizontal scan frequency). A pilot subcarrier at 15.734 KHz is used at the receiver for system identification and synchronization for demodulation of the L−R suppressed-carrier signal.

A Secondary Audio Programming (SAP) channel can be transmitted simultaneously with the stereo signal in the MTS format. The SAP signal may be transmitted in a language different from that of the stereo signal (hence the term "secondary language"). Thus, for example, the stereo signal could be transmitted in English while the secondary language signal is transmitted in Spanish or German. This allows a viewer equipped with appropriate receiving apparatus to watch the same picture signal but hear a different sound signal, typically in another language. The SAP channel has an audio bandwidth of 10 KHz and exists as a frequency modulated signal centered at 5 times the horizontal scanning frequency. The choice of subcarrier frequencies as multiples of the horizontal scan frequency minimizes the potential beat and buzz problems between the video and audio signals. The beats fall at or near zero frequency and are therefore suppressed by the normal low-frequency roll-off of the audio system. A typical MTS receiver decoder illustrated in FIG. 1(b) is well known in the prior art and makes use of a matrix for combining the L+R and L−R signals to produce separate outputs for left and right stereo channels. U.S. Pat. No. 4,048,654 to Wegner also discloses the use of left and right stereo channels to transmit different languages in monaural format instead of using a separate SAP channel for this purpose.

Japan uses a variation of the MTS format called EIA-J (Electronics Industries Association—Japan). For stereo broadcasts, it contains a L+R sum signal which frequency modulates an audio carrier (as in the MTS format, so as to be compatible with existing monaural receivers), and a L−R stereo difference signal of 14 KHz bandwidth transmitted as a frequency modulated signal on an audio carrier at 31.468 KHz (two times the horizontal scan frequency). A pilot subcarrier at 55.07 KHz (three and one half times the horizontal scan rate) is amplitude modulated with an identification tone to activate decoding circuitry in stereo receivers. When broadcasting dual languages, a first language is frequency modulated onto the first audio carrier, and a second language is frequency modulated onto the second audio carrier.

The MTS format, U.S. Pat. No. 4,048,654 disclosing two languages in a stereo format, and the Japanese EIA-J format all use a single audio carrier within the television broadcast which is multiplexed with secondary signals such as a stereo difference signal and a Secondary Audio Programming (SAP) signal (i.e., carriers for the L−R and SAP signals are multiplexed onto the main sound carrier).

Instead of the MTS format, many European countries use a dual carrier audio format for television in which two separate sound carriers are frequency modulated rather than multiplexing a single sound carrier. The dual carrier format is used to support either stereo sound reception or two independent monaural sound signals (typically in two different languages) within a television broadcast as illustrated in FIG. 1(c) and FIG. 1(d). As in the MTS system, a main sound carrier $SC_1$ is frequency modulated with the sum L+R signal in order to maintain compatibility with monaural television receivers when broadcasting in stereo. A second, independent sound carrier $SC_2$ is frequency modulated with only the right stereo channel at a lower amplitude than the main sound carrier. Another variation of this format transmits stereo by frequency modulating the second sound carrier with a difference signal L−R instead of the right-only channel. When transmitting two languages, each sound carrier is frequency modulated with a monaural signal in a different language as shown in FIG. 1(d). One specific example of a dual carrier format is the Phase Alternating Line-B/G or PAL-B/G used in countries such as Thailand. Other countries, including Germany and South Korea, also use the dual carrier format with slight variations. A comparison of the MTS format of FIG. 1(a) may be made with the dual carrier format of FIG. 1(c) by noting that all the signals shown in FIG. 1 (a) are multiplexed onto a single sound carrier such as SC$_1$ shown in FIG. 1 (c) in the MTS format.

With the dual carrier format, conventional television sets which accept only a single sound carrier for a given broadcast cannot select the second alternate language channel for the broadcast without modifications to the television receiver. Alternatively, cable television converters or other similar devices can be constructed to incorporate dual demodulators to demodulate both primary and alternate channels, but this would result in increased costs and would not allow the user to remotely control the selection of language in a fashion consistent with the cable television converter or television receiver. Moreover, there is no programmable method of altering the signal selections within a broadcast to support future changes in cable television formats, such that different variations of the signal selection process could be practiced without hardware modifications to cable television converters or television receivers. Thus, it is desirable for a cable television converter to be designed such that it could handle different television formats by simple reprogramming rather than hardware modifications.

It may be desirable for a cable operator to add a second language or other secondary channel programming to a primary language broadcast and have both sound signals transmitted simultaneously as part of a modified broadcast. Unfortunately, either the television receiver must be modified to accept this second channel, or the cable converter apparatus must be provided with two or more frequency modulation demodulators.

U.S. Pat. No. 4,486,897 to Nagai discloses an apparatus for selecting and demodulating a composite sound signal (such as MTS or EIA-J) containing both a stereo signal (left and right channels) and a monaural alternate language sound signal. The Nagai apparatus, shown in FIG. 1(e), allows selection of either a stereo output of left and right channels, or two monaural output channels, the two outputs in the latter case typically supplied in two different languages. The prior invention uses a single FM demodulator to accomplish this result.

The prior invention, however, does not allow independent selection of signals in a dual carrier system in which two frequency modulated sound carriers are transmitted. In a dual carrier system, each monaural channel must be individually selectable and demodulated independently of the other. The matrix and switching of the prior invention requires that the first signal be comprised of the sum of a stereo signal of left and right channels, so that if the monaural signal is selected, the summed left and right channels will be correctly produced at the output of the apparatus for the primary language. It does not allow either of two carriers modulated with monaural signals to be independently selected for demodulation.

Moreover, the prior invention does not provide a remodulated output which recombines a demodulated signal with the video signal suitable for the radio frequency receiving input of a television receiver. In addition, there is no low-cost method disclosed in the prior invention for tuning the demodulation element which would be economically advantageous when used in large scale production of, for example, cable converter devices. Moreover, there is no method disclosed for allowing a stereo signal to be transparently passed through to a television receiver which can accept and demodulate such a signal when used in conjunction with the prior invention, thus degrading the usefulness of the device where such a television receiver is available.

SUMMARY OF THE INVENTION

Accordingly, it is an object of this invention to solve the aforementioned problems by allowing a separate signal to be selected, demodulated and remodulated prior to presentation to a television receiver so that the television receiver need not be modified to handle, for example, a secondary audio signal. Specifically, it is an object of this invention to solve the inability of prior inventions to select and demodulate a separate signal from within a dual language format television broadcast. It is a further object of this invention to solve the inability of prior inventions to provide a remodulated output suitable for use in a television receiver where a dual carrier television format is transmitted. It is a further object of the present invention to solve the failure of prior inventions to provide a low-cost method of tuning a demodulation element which would be economically advantageous when used in the production of, for example, cable converter devices. It is a further object of this invention to allow a stereo sound signal to be transparently passed to television receivers which accept stereo signals while simultaneously solving the above-mentioned problems.

To meet these objectives, the present invention provides an apparatus for demodulating and remodulating a broadcast signal comprising a video signal, a first channel signal, and a second channel signal, the apparatus comprising a switching means for selecting one of the first and second channel signals within the broadcast signal to produce a selected channel signal, a demodulation means controlled by the switching means to demodulate the selected channel signal, thereby producing a demodulated signal, and a modulation means for remodulating the demodulated signal to produce a resulting signal and combining the resulting signal with the video signal.

The present invention further defines a method of selecting, demodulating and remodulating a signal from within a broadcast containing a video signal and two or more accompanying signals, the method comprising the steps of selecting one of the two or more accompanying signals to produce a selected signal, demodulating the selected signal, frequency modulating the selected signal to produce a remodulated signal in the frequency spectrum of the broadcast, and combining the remodulated signal with the video signal and at least one other of the two or more accompanying signals which was not demodulated.

The present invention further provides a system for transmitting, receiving, demodulating and remodulating a broadcast signal comprising a video signal, a first channel signal and a second channel signal, the system comprising transmission means for transmitting the broadcast signal, tuning means for receiving and tuning to the broadcast signal, switching means for selecting one of said first and second channel signals within the broadcast signal to produce a selected channel signal, demodulation means controlled by the switching means to demodulate the selected channel signal, thereby producing a demodulated signal, and modulation means for remodulating the demodulated signal to produce a resulting signal and combining the resulting signal with the video signal.

The present invention further provides an apparatus for selecting, demodulating and remodulating a transmitted signal containing a varactor diode tuning means for inexpensively controlling a frequency modulation demodulator contained within the apparatus.

The present invention further provides an apparatus for selecting, demodulating and remodulating a transmitted signal containing a microprocessor means for controlling the selection of the signal. Such a means can be remotely controlled by a user in accordance with remote control technology widely known in the existing art.

The present invention further provides an apparatus for selecting, demodulating and remodulating a transmitted signal in which the signal selection is under the control of a microprocessor, wherein the signal selection and associated demodulation parameters may be programmed into the microprocessor to accommodate future changes to the transmitted signal structure without substantially changing the physical apparatus.

The present invention further provides, in an apparatus containing a frequency modulation demodulator, a means of tuning the center frequency of the frequency modulation demodulator comprising a varactor diode, a tank circuit comprising a capacitor and inductor coupled to the varactor diode wherein capacitance of the varactor diode changes the resonant frequency of the tank circuit, and a frequency modulation demodulator, coupled to the tank circuit, wherein the resonant frequency of the tank circuit corresponds to the center frequency of the frequency modulation demodulator.

BRIEF DESCRIPTION OF THE DRAWINGS

FIG. 1 (b) shows a known prior art apparatus for decoding an MTS stereo broadcast signal. FIG. 1 (c) is a simplified frequency spectrum of a dual carrier frequency modulation (FM) television signal when used for broadcasting stereo. FIG. 1 (d) is a simplified frequency spectrum of a dual carrier television signal when used for broadcasting two monaural signals in different languages. FIG. 1 (e) shows a known prior art apparatus for decoding an MTS stereo signal which employs a single demodulator.

FIG. 5 shows a varactor diode tuning means 516 coupled to demodulation means 508a of the present invention, controlled by microprocessor 511 through electrical switching means 512a.

FIGS. 6A, 6B and 6C show pin-outs for the Mitsubishi M5144P demodulator used in a preferred embodiment of the invention.

In the figures, the last two digits of reference numerals refer to similar elements across all figures.

DETAILED DESCRIPTION OF THE INVENTION

Figure 1A:
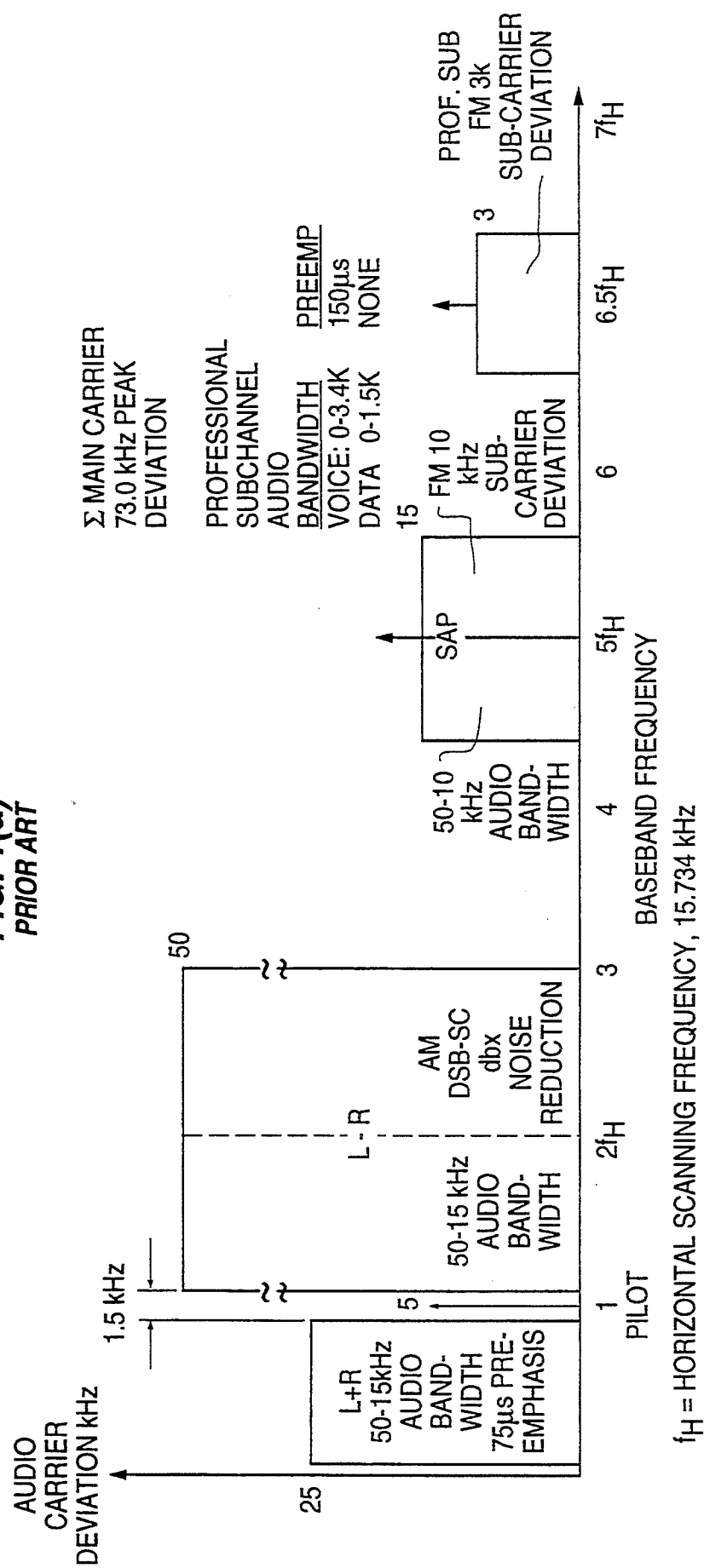
FIG. 1 (a) shows the frequency spectrum of a Multichannel Television Sound (MTS) stereo broadcast signal.
Figure 1B:
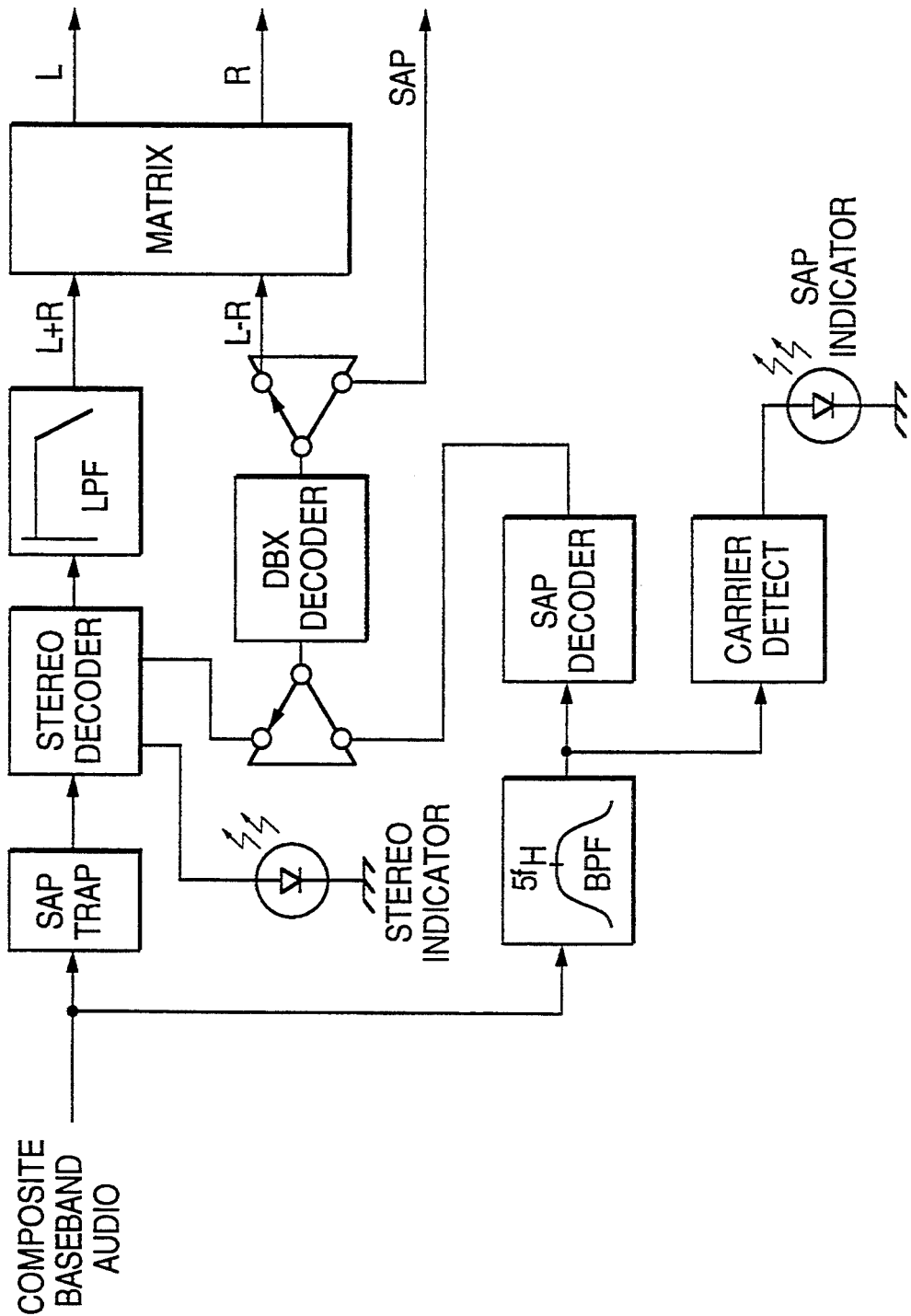

FIG. 1 (a) shows the frequency spectrum of a Multichannel Television Sound (MTS) television signal known in the prior art, and FIG. 1 (b) shows a block diagram of a known prior art apparatus for decoding this signal for use with a television receiver to receive a stereo signal and a Secondary Audio Programming (SAP) signal which may be in a different language from the stereo broadcast. Many such signals may be simultaneously transmitted. In a cable television system, for example, a plurality of video carriers are "stacked" in frequency (frequency multiplexed) to provide a subscriber with a number of television broadcasts which can be selected by tuning a receiver to the appropriate signal frequency. Each of these broadcasts may contain a stereo sound signal and Secondary Audio Programming signal. Although the United States uses the MTS format for television broadcasts, other countries use other standards.

Referring to FIGS. 1 (c) and (d), a simplified spectrum of a dual carrier television signal of a type used in many non-United States countries is shown. In one mode of transmission (FIG. 1 (c)), the dual carrier format contains a video carrier VC, a first sound carrier $SC_1$, and a second sound carrier $SC_2$, onto which a video signal, a signal comprised of the sum of a stereo left channel and right channel (L+R), and a signal corresponding to the right channel of the same stereo signal (R) are modulated, respectively. In this first mode, the individual stereo components may be recovered from the combined broadcast by subtracting the right channel signal from the sum signal:

LEFT=(L+R)−R

RIGHT=R

The second mode of the dual carrier format in FIG. 1 (d) shows how two monaural, alternate language signals (language A and language B) may be modulated onto these two separate sound carriers and transmitted with the video signal. Many conventional television receivers are only equipped to recover a single sound carrier at a fixed location in this format, hence either modifications to the television receiver or additional demodulators external to the television receiver are required to recover the second sound signal.

Although the present invention is particularly directed to selecting one signal from within this dual carrier format, it is readily apparent that more than one signal may be selected by adding components to the basic apparatus. Moreover, a signal may be selected from a set of more than two carriers with appropriate selection of filter and demodulation parameters well known to those of ordinary skill in the art. Moreover, different variations of the television format are possible for which this invention may operate by changing specific parameters of the filtering or demodulation means. These include, for example, National Television Standards Committee (NTSC) and Sequentiel a Memoire (SECAM). In addition, it would of course be possible for non-audio signals to be demodulated in the same manner (e.g., closed captioning or other information intended to be displayed as part of the video signal) with suitable demodulators well known in the industry.

Figure 1C:
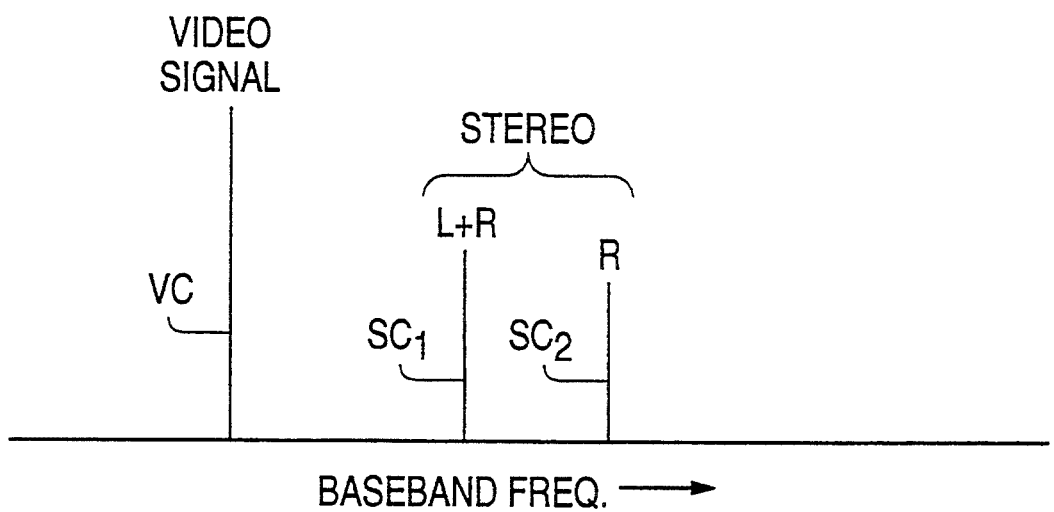
Figure 1D:
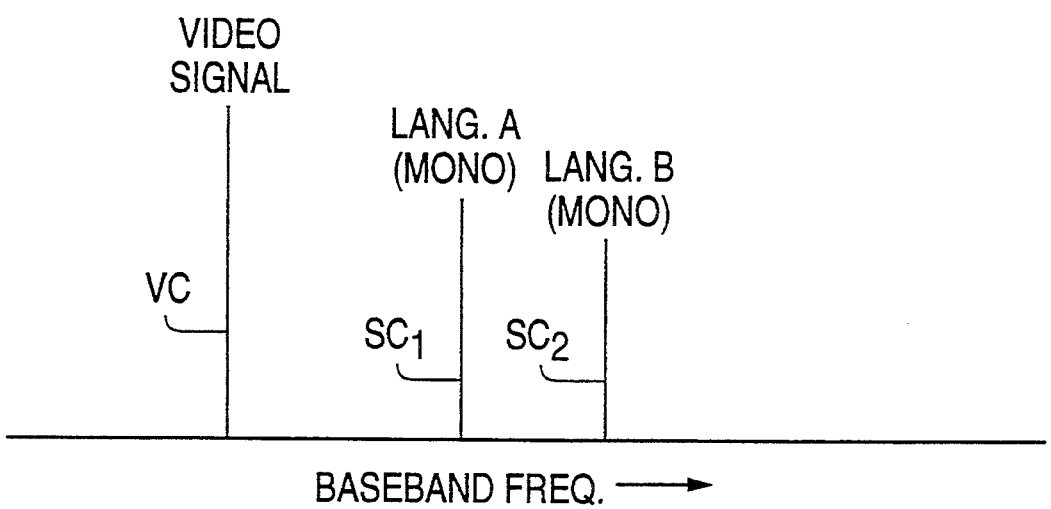
Figure 1E:
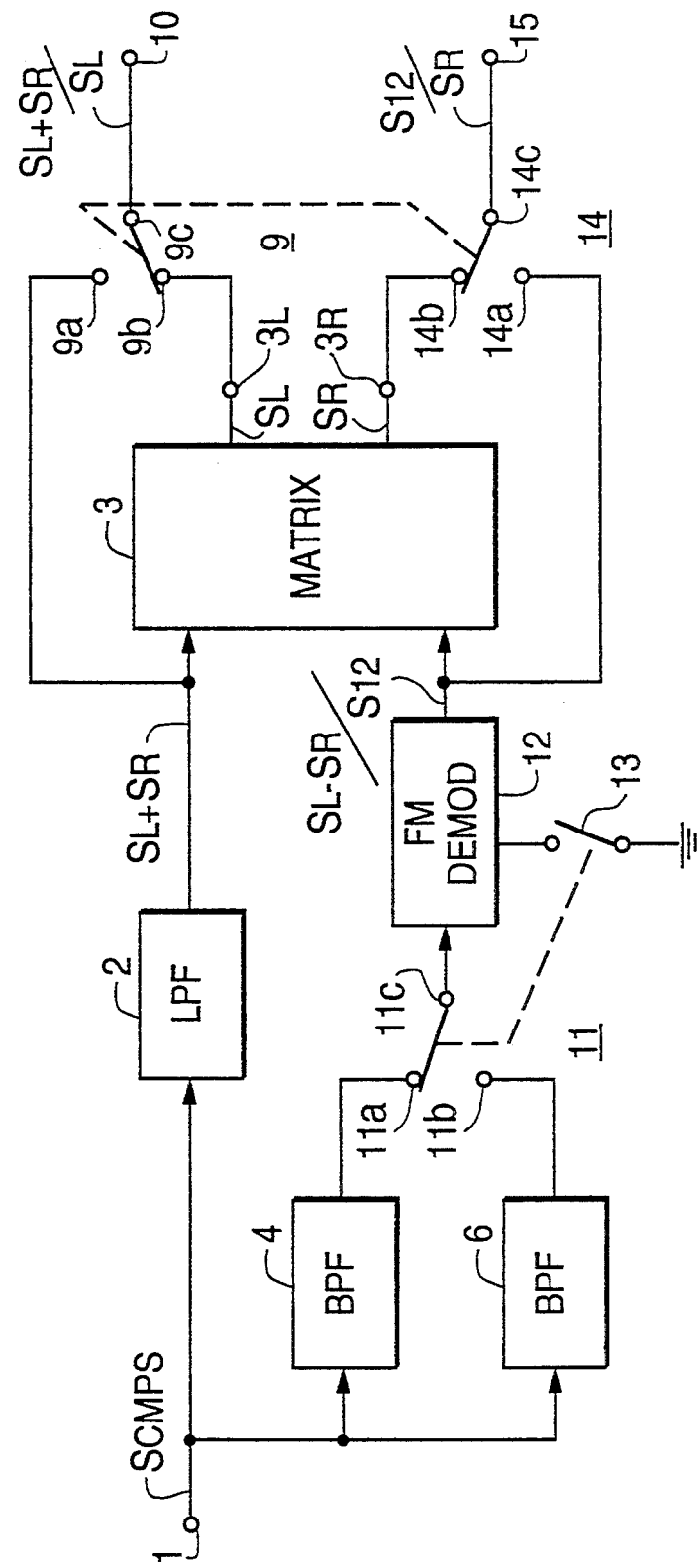
Figure 2:
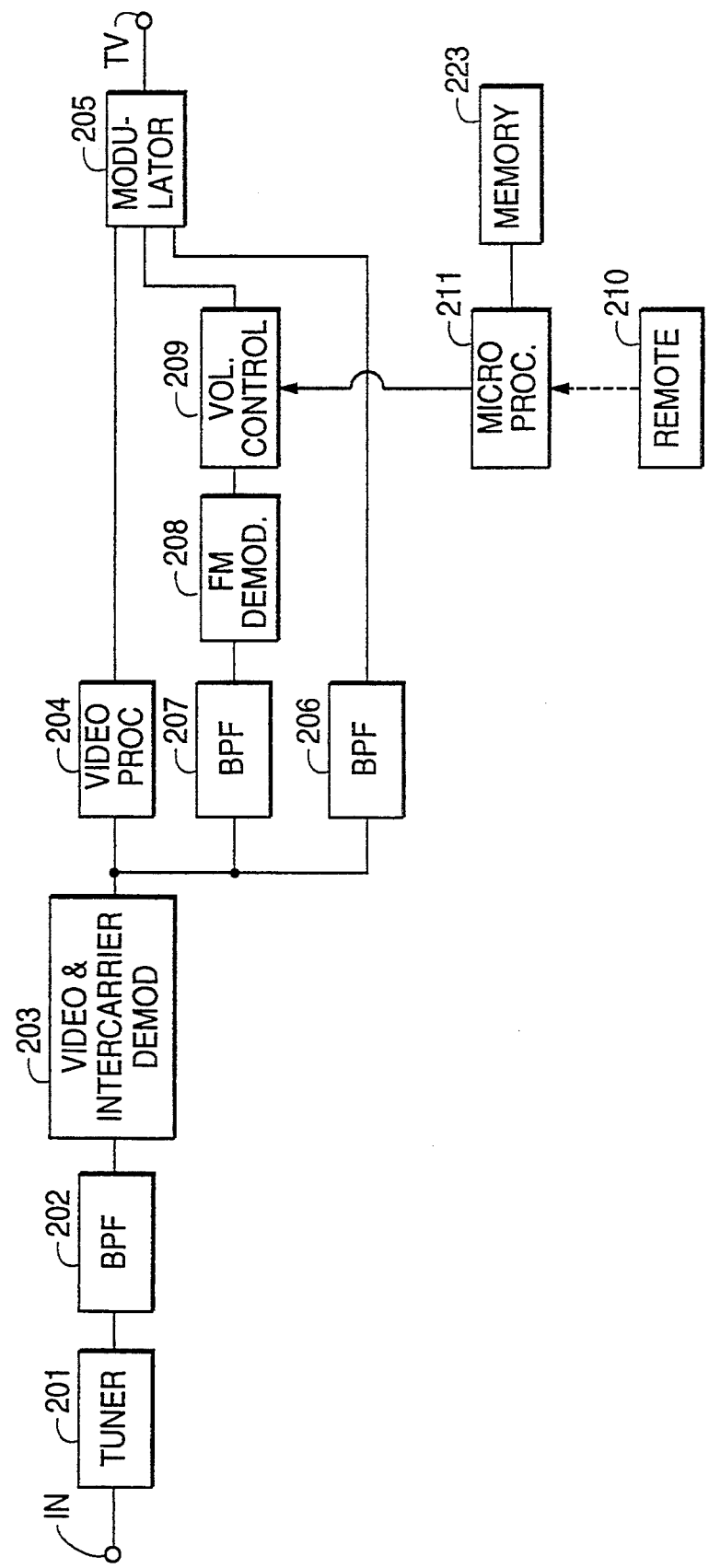
FIG. 2 is a block diagram showing a known prior art apparatus for demodulating and remodulating a single channel signal prior to reception by a television receiver.

FIG. 2 shows a block diagram of a known apparatus for demodulating and remodulating a single sound signal received from a television broadcast prior to reception by a television receiver. A television signal to be viewed is supplied to a tuner 201 which shifts the signal up or down in frequency in order to tune to the desired television broadcast. The tuner produces an intermediate frequency to bandpass filter 202 which further narrows the signal in frequency before input to video and intercarrier demodulator 203. The output of demodulator 203, in a dual carrier broadcast, contains not only the video signal but two audio signals. In the Phase Alternating Line (PAL-B/G) television format, for example, a primary audio signal may be present on a carrier at 5.5 MHz and a secondary audio signal present on a 5.742 MHz carrier (frequencies are with reference to the video carrier). The output of the demodulator 203 is fed to two bandpass filters 206 and 207 which segregate the two audio signals. The primary audio signal from bandpass filter 207 (which may be a primary monaural language transmission, or a summed stereo signal as shown in FIG. 1(c)) is fed to a demodulator 208 to recover the audio (hereinafter called baseband audio) and to a volume control 209 which may be controlled by microprocessor 211. The television viewer (hereinafter called a subscriber), who may be receiving the television signal via cable, conventional atmospheric propagation or other means, can instruct microprocessor 211 of the desired volume, most commonly by way of remote control 210. The baseband audio signal, after passing through volume control 209, is passed to modulator 205, which puts it back on a 5.5 MHz sound carrier, combines it with the video from video processing circuitry 204, and supplies the output to the subscriber's television receiver. The secondary audio, for example produced at 5.742 MHz, is passed from bandpass filter 206 to modulator 205 for mixing with the video and primary audio signal before presentation to the television receiver. In addition, baseband outputs may be supplied to separate connectors on the chassis of this apparatus for external use in other systems (e.g., a stereo hi-fi system). Using this approach, it is not possible to selectively demodulate the secondary channel (from BPF206) unless the television receiver itself provides the capability to handle the second channel directly.

Figure 3:
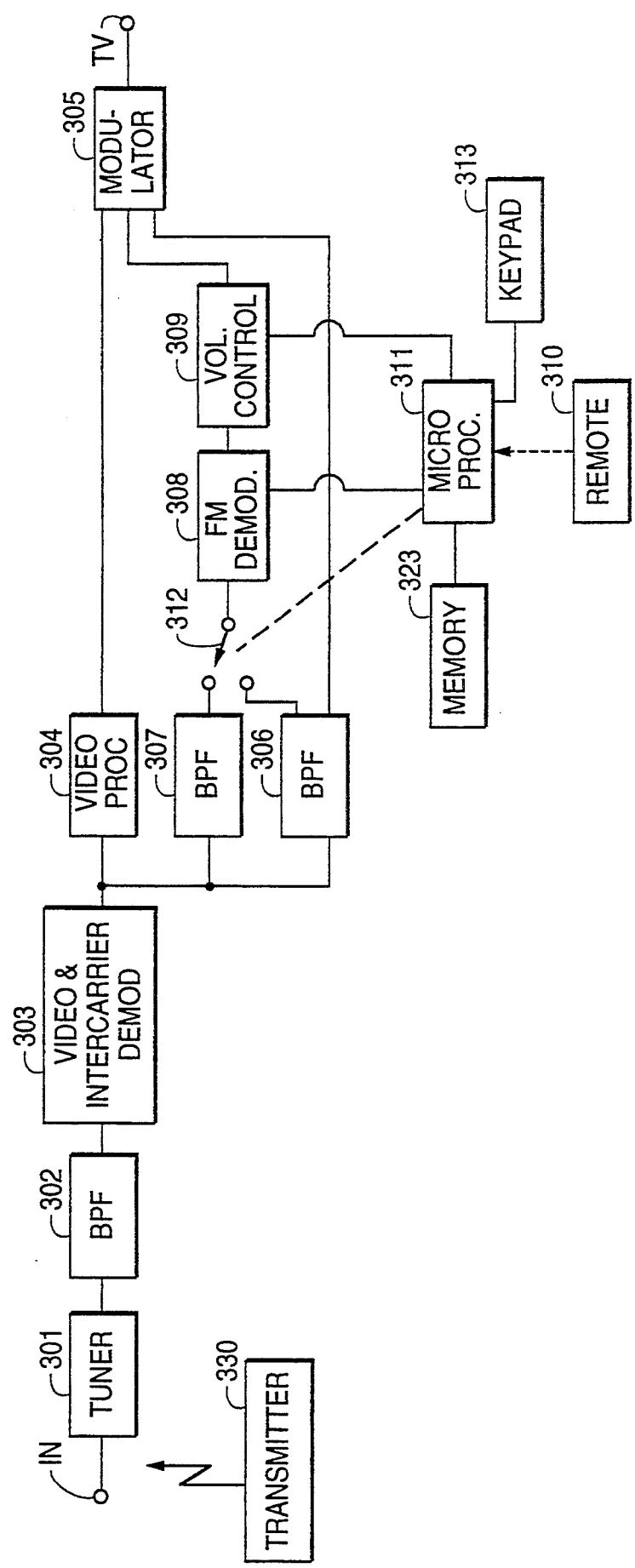
FIG. 3 is a block diagram of one embodiment of the present invention for selecting, demodulating and remodulating a selected channel signal before presentation to a television receiver. In particular, switching means 312, demodulator 308 and microprocessor 311 allow selection of a signal within the television broadcast following intercarrier demodulator 303 and bandbpass filters 306 and 307. The result is then remodulated in modulator 305 for presentation to, e.g., a television receiver.

FIG. 3 is a simplified block diagram of the present invention which allows the subscriber to select a secondary channel (containing, for example, an alternate language signal within the broadcast) for presentation to the television receiver. Transmitter 330 can be a conventional television station, a cable television head end, a direct transmission satellite or a similar transmitter suitable for broadcasts which incorporate video and accompanying signals. The operation of tuner 301, filter 302 and demodulator 303 are identical to that of FIG. 2 and no further elaboration is required.

Figure 5:
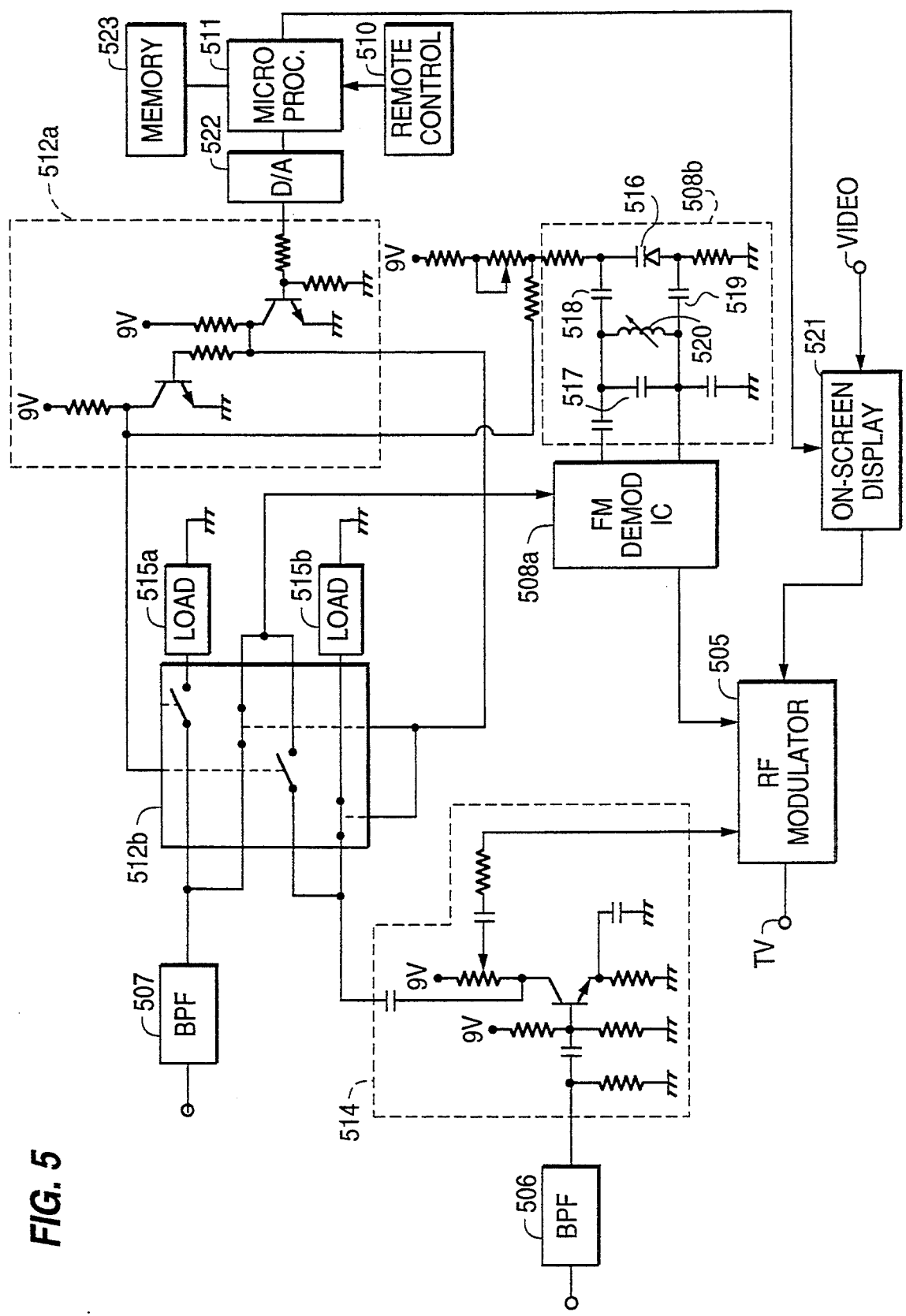
Figure 6A:
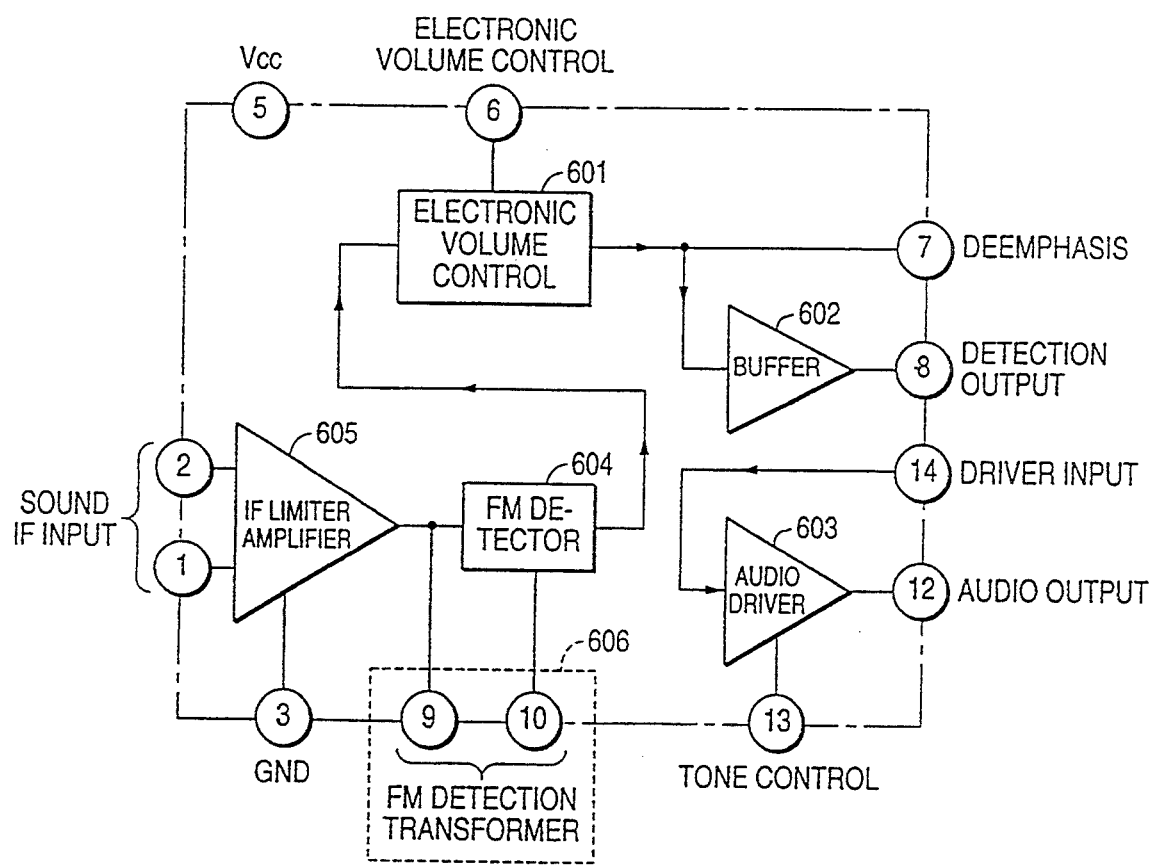
Figure 6B:
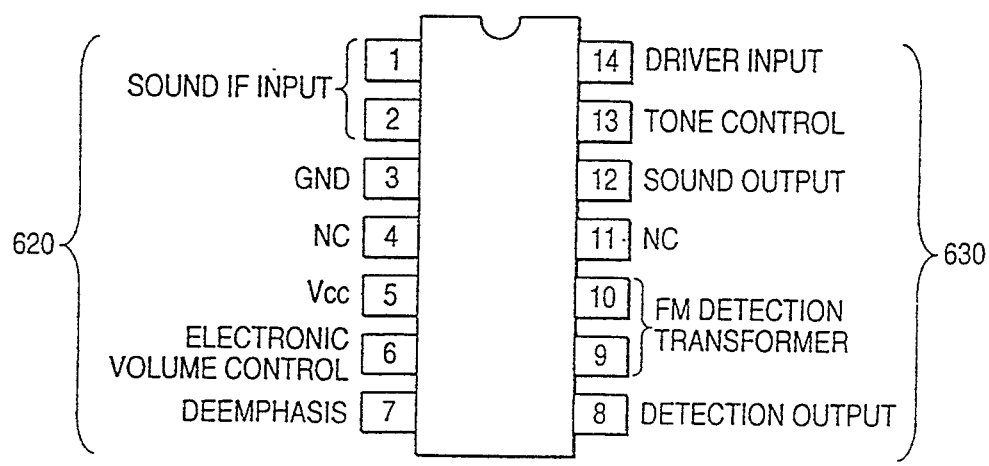

Switching means 312 selects one of the two signals from band pass filters 307 or 306 (e.g., primary or secondary) to be supplied to demodulator 308. This switching means may be controlled by microprocessor 311 which in turn would ordinarily receive its instructions from the subscriber by way of remote control 310. Alternately, such switching means could be controlled from a mechanical switch, or from a local keypad 313 connected to microprocessor 311. Demodulator 308 (which could, for example, be implemented with Mitsubishi model number M5144P integrated circuit) must be tuned to recover one or the other signal according to the position of switching means 312. This tuning may be accomplished in any of several ways. One method would be to switch inductive or capacitive components in the demodulator tuned circuit ("tank") to apply a phase shift necessary to recover the desired signal from the frequency modulated carrier of interest. Another method, shown in more detail in FIG. 5, uses a novel varactor diode tuning means to apply the necessary and variable phase shift (using, for example, Panasonic part number MA 372) which is controlled by microprocessor 511 using a simple program contained in memory 322. The selected signal is demodulated in demodulator 308, passed through volume control 309 and remodulated in modulator 305 with the video signal prior to presentation to a television receiver. FIG. 6A shows a block diagram of the Mitsubishi M5144P demodulator, including electronic volume control 601, buffer 602, audio driver 603, IF limiter amplifier 605 having an output coupled to pin 9, and FM detector 604 having an input coupled to pin 10. FM detector 604 is thus coupled to pins 9 and 10, which collectively form an FM detection transformer 606. Pins 9 and 10 may be coupled to the tank circuit as shown in FIG. 5 with respect to FM Demod IC 508a. FIG. 6B shows a top view of the M5144P device, comprising a first grouping of pins 620 and a second grouping of pins 630. These pins correspond to those shown in FIG. 6A. FIG. 6C shows a typical application example for the M5144P which is well known in the art, including sound output circuit 608, sound IF input circuit 609, power supply voltage 610, electronic volume control circuit 611, and a fixed tune circuit 607 which is coupled to the FM detection transformer pins. Instead of fixed tune circuit 607, various embodiments of the present invention contemplate using variable tuning circuit 508b (see FIG. 5) which allows the center frequency of the demodulator to be changed by way of varactor diode 516.

To allow for transparent pass through of a stereo broadcast to a television receiver equipped to handle such a broadcast, switching means 312 can be positioned to select the primary audio signal containing, for example, a L+R stereo signal for presentation to the television receiver from band pass filter 307 which is set to the pass band of the L+R summed signal. A secondary signal path between bandpass filter 306 and modulator 305 is provided to allow for the pass through of the second channel. In this mode, the television receiver would perform the stereo demodulation using both the L+R and R signals, as the L+R signal is demodulated and remodulated in modulator 305 (see FIG. 4), returning the original signal, and the R signal is passed through without demodulation.

Figure 4:
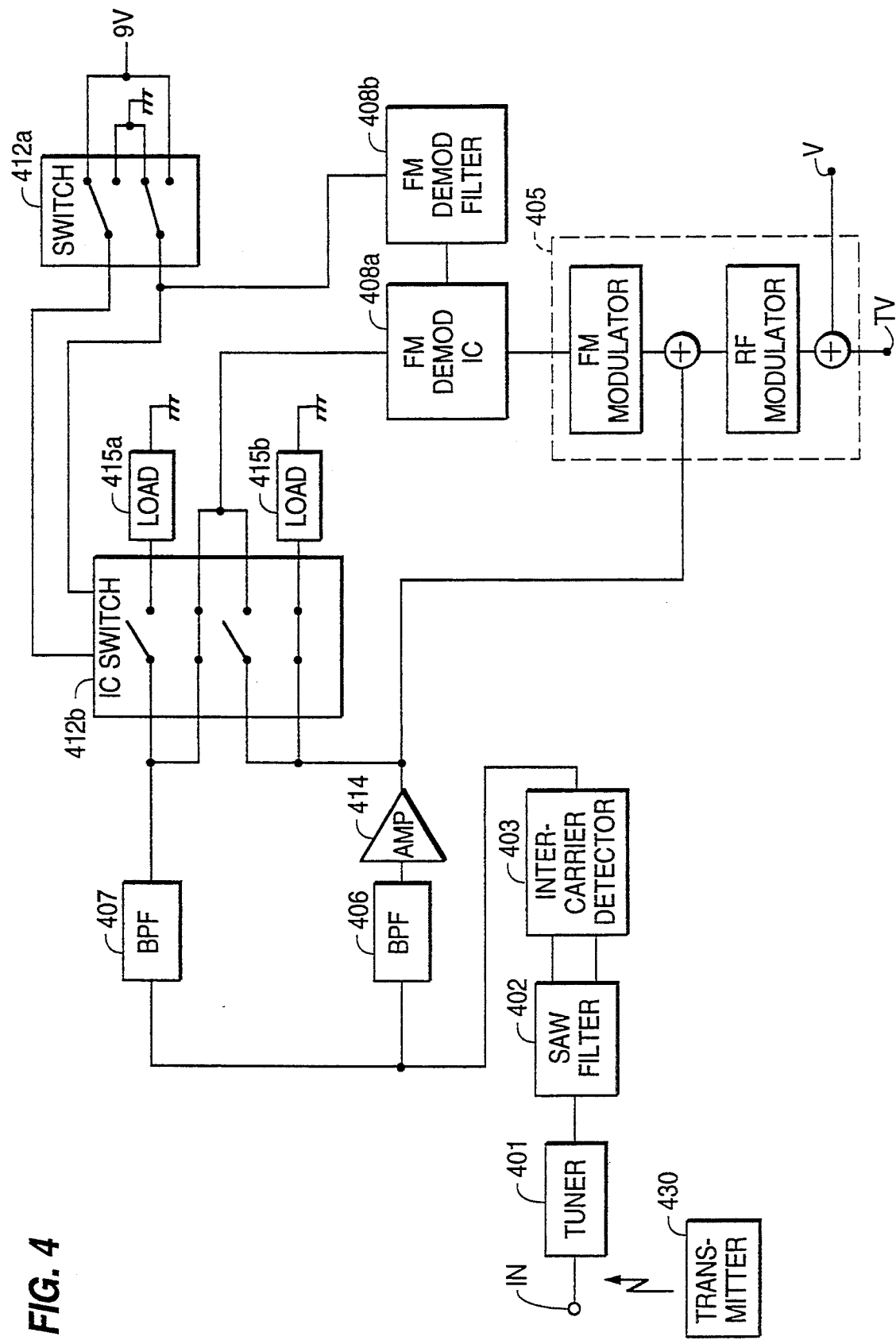
FIG. 4 shows details of the embodiment of FIG. 3 for the present invention with emphasis on the switching means. In particular, FM demod filter 408b and switching means 412a and 412b change the signal selection.

FIG. 4 shows more detail of one embodiment of the present invention. A television broadcast signal enters tuner 401 and passes through surface acoustic wave (SAW) filter 402 (implemented, for example, using Siemens part number G3652), then to intercarrier detector 403 (using, for example, Scientific Atlanta part number M52302P). The resulting signal is fed to bandpass filters 406 and 407, which pass signals in the frequency ranges corresponding to the two audio signals. Amplifier 414 boosts the signal level of the right channel for best performance when stereo pass through is used. Switching means 412a (e.g., an electrical or mechanical switch) controls a voltage level to control lines entering switching means 412b, which in this embodiment can be implemented using an IC switch (for example, Toshiba model number HD14066BP integrated circuit). Switching means 412b, based on control line inputs from 412a, routes either signal 1 (at, e.g., video carrier plus 5.5 MHz) from band pass filter 407, or signal 2 (at, e.g., video carrier plus 5.742 MHz) from band pass filter 406, to frequency modulation demodulator 408a (for example, Mitsubishi model number M5144P integrated circuit). A switchable demodulator filter 408b, made up of a number of components (including, for example, varactor diode Panasonic MA372 and ordinary capacitors and inductors), is simultaneously switched when switching means 412a is engaged such that frequency modulation demodulator 408a is aligned in frequency with the carrier frequency of the selected signal.

In this particular configuration, the AC signal passing through each of the four switches in IC switch 412b should have a peak to peak voltage swing that falls between the two supply voltages applied to the IC. Because the apparatus in this configuration is supplied with only positive voltages, Vss is grounded and 9 volts are applied to Vdd in this IC. A DC bias voltage of 4.5 volts is applied to the four switch inputs of IC switch 412b so that the audio carrier can swing to its positive and negative peaks without being clipped by IC switch 412b. Dummy loads 415a and 415b are switched into the path of the audio carrier that is not selected so that other circuitry in the apparatus is not adversely affected. The dummy loads are equivalent to the load presented by demodulator 408a and can be implemented using capacitors and resistors of appropriately selected values.

The resulting baseband audio output (of the selected sound signal) from demodulator 408a is passed through modulator 405, which remodulates the audio to the frequency expected by the television receiver for the first signal and combines this with the second sound signal and the video signal prior to presentation to the television receiver. Volume control 309 of FIG. 3 is omitted from FIG. 4 for clarity. For transparent stereo pass through, amplifier 414 supplies the second signal to modulator 405 where it is combined with the primary signal. In summary, the television receiver is provided with both signals when the primary signal is selected, but with a downwardly frequency shifted version of the second sound signal when the second signal is selected (thus "replacing" the primary signal with the second signal).

FIG. 5 illustrates a further embodiment of the present invention employing a varactor diode tuning means under microprocessor control to tune the demodulator. Microprocessor 511 controls a voltage to be supplied to a varactor diode 516 (e.g., Panasonic part number MA 372) through electrical switch 512a based on a simple program contained in memory 523. For example, when 9 volts control voltage is applied to switchable demodulator filter 508b through electrical switching means 512a, the capacitance of the varactor diode, in combination with the three other tank capacitors 517, 518 and 519 resonates with inductor 520 at a frequency designed to demodulate the signal simultaneously selected from band pass filter 506 by IC switch 512b.

In another state, microprocessor 511 causes another voltage (e.g., zero volts) to be applied to switchable demodulator filter 508b. In this state, voltage division of the 9 volt supply results, and approximately 2.1 volts is applied to the cathode of varactor diode 516. The combined capacitance resonates as described above at a frequency which demodulates the signal simultaneously selected from band pass filter 507 by IC switch 512b. Various different voltage levels may be stored in memory 523 which may be fetched and applied to varactor diode 516 in accordance with a simple program executing in microprocessor 511.

It is readily apparent that different voltage levels could be applied to achieve a variety of filtering effects under control of the microprocessor. Thus, variations in signal formats can be accommodated by simple reprogramming of the voltage level from the microprocessor, without the need to change the physical apparatus. For example, a digital to analog converter 522 can be inserted between the output of microprocessor 511 and switch 512a to continuously vary the voltage applied to varactor diode 516. Such simple programming techniques to change the voltage level on an analog line using a microprocessor and a digital to analog converter are well known to those of ordinary skill in the art.

Thus, for example, German dual carrier format (5.5 MHz and 5.7428 MHz carriers), Korean dual carrier format (4.5 MHz and 4.7242 MHz), and PAL I dual carrier format (6.0 MHz) can be supported by simple reprogramming of microprocessor 511. Similarly, a varactor diode tuning means can be implemented for band pass filters 506 and 507 to change their pass band in the same manner as that described here.

With reference to FIG. 5, it is readily apparent that an output signal from microprocessor 511 may be supplied to a character generator 521 to generate on-screen selections for the television viewer, commanded by remote control means 510. In this variation, the television viewer may select from alternate signals (e.g., an alternate or primary language) from an on-screen display under control of microprocessor 511. The on-screen display means 521 manipulates the video signal prior to remodulation in modulator 505 and subsequent presentation to the television receiver. It is readily apparent that the microprocessor could be connected to modulator 505 to control it in a similar manner to change its settings.

In one embodiment of the present invention, modulator 505 may be implemented, for example, using Toshiba modulator IC part number TA8637BP. This IC has a pin that is used to adjust the level of the audio signal at 5.5 MHz that it generates. Level adjustment is accomplished by "loading" audio signal path 2 (after amplifier 514 in FIG. 5) at pin 3 of this particular IC with a reactive component. The modulator unit, if purchased "off the shelf", is designed so that audio signal 1 (output from demodulator 508a of FIG. 5) is set to the proper level, and no adjustments to the signal level should be needed.

To cheaply and effectively achieve transparency of the second signal through the disclosed apparatus, the second signal should be added to the path carrying the first signal before the final conversion to the output of the apparatus. In one preferred embodiment, the Toshiba modulator IC is not designed to support the dual carrier format. To get around this problem, signal 2 (i.e., from band pass filter 406 of FIG. 4) is added to the signal 1 path by injecting signal 2 into pin 3 of Toshiba modulator IC (modulator 405 of FIG. 4). But because there is a line attached to pin 3 of the Toshiba modulator IC, this "loads" down signal 1 so that the level of signal 1 is too low. Therefore, the circuit must be designed such that the proper level of signal 2 is injected into the modulator IC and the impedance of the line carrying signal 2 is not a problem. This will ensure that the proper ratio of the video and audio carriers is maintained.

It is apparent that many modifications and variations of the present invention are possible in light of the above teachings. Thus, for example, although emphasis has been placed on the dual carrier signal format with particular frequency carriers specified, it has been pointed out that other signal formats may be implemented by varying demodulation parameters, filter parameters and reprogramming the microprocessor means. Moreover, variations on a varactor diode tuning circuit may be implemented which depart from the specific circuit shown here. Aside from applications to cable television converters, the present invention can clearly be used for purposes outside this use, such as where a directly broadcast signal is transmitted to a subscriber from a satellite. It is, therefore, to be understood that within the scope of the appended claims the invention may be practiced otherwise than as specifically described.

What is claimed is:

1. An apparatus for demodulating and remodulating a broadcast signal prior to presentation to a television receiver, said broadcast signal comprising a video signal, a first channel signal frequency modulated onto a first carrier frequency, and a second channel signal frequency modulated onto a second carrier frequency, said apparatus comprising:
   switching means for selecting one of said first and second channel signals frequency modulated onto said first and second carrier frequencies to produce a selected channel signal,
   demodulation means having an input for accepting said selected channel signal and controlled by said switching means to demodulate said selected channel signal, thereby producing a demodulated signal, and
   modulation means for remodulating said demodulated signal to produce a resulting signal and combining said resulting signal with said video signal.

2. An apparatus as in claim 1, wherein said demodulation means further comprises a varactor diode tuning means which aligns a tuned frequency of said demodulation means with said selected channel signal.

3. An apparatus as in claim 2, wherein said switching means applies a voltage level to said varactor diode means for changing said tuned frequency established by said varactor diode tuning means.

4. An apparatus as in claim 1, further comprising a programmable microprocessor means coupled to said switching means and to said demodulation means for programmably controlling said switching means and said demodulation means.

5. An apparatus as in claim 4, further comprising a remote control means coupled to said microprocessor means for controlling said switching means and said demodulation means.

6. An apparatus as in claim 5, further comprising an on screen display means coupled to said microprocessor means for displaying one or more selections for said switching means.

7. An apparatus as in claim 4, further comprising a volume control means between said demodulation means and said modulation means.

8. An apparatus as in claim 7, wherein said volume control means is controlled by said microprocessor means.

9. An apparatus as in claim 2, further comprising a microprocessor means coupled to said varactor diode means and wherein said microprocessor means is programmable to provide different voltage levels to said varactor diode means.

10. An apparatus as in claim 1, further comprising two band pass filters coupled to and prior to said switching means, the frequency pass bands of said band pass filters corresponding to the frequency bands of said first and second channel signals, respectively.

11. An apparatus as in claim 1, wherein said modulation means further combines one of said channel signals which was not selected with said selected channel signal and said video signal.

12. An apparatus as in claim 9, further comprising a digital to analog converter means coupled between said microprocessor means and said varactor diode tuning means for varying the voltage level applied to said varactor diode means within a range of values.

13. A method of selecting, demodulating and remodulating a signal from within a broadcast containing a video signal and two or more accompanying signals, said method comprising the steps of:
   selecting one of said two or more accompanying signals to produce a selected signal;
   demodulating said selected signal;
   frequency modulating said selected signal to produce a remodulated signal in frequency spectrum of said broadcast; and
   combining said remodulated signal with said video signal and at least one other of said two or more accompanying signals which was not demodulated.

14. A method as in claim 13, wherein said step of selecting one of two said accompanying signals and said step of demodulating said accompanying signal are controlled by a microprocessor.

15. A method as in claim 13, wherein said step of frequency modulating said selected signal results in a downwardly shifted frequency spectrum for said selected signal from its original spectrum within said broadcast.

16. In an apparatus containing a frequency modulation demodulator having an FM detector input and a limiter output, a circuit for tuning a center frequency of said frequency modulation demodulator comprising:
   a varactor diode;
   a tank circuit having a resonant frequency, comprising a capacitor and an inductor, said tank circuit coupled to said varactor diode, wherein the capacitance of said varactor diode changes said resonant frequency of said tank circuit, and
   said frequency modulation demodulator, wherein said FM detector input and said limiter output are coupled to said tank circuit, and wherein said resonant frequency of said tank circuit corresponds to said center frequency of said frequency modulation demodulator, said tank circuit applying one of two predetermined fixed phase shifts, determined by said resonant frequency, between said limiter output and said FM detector input, each predetermined fixed phase shift corresponding to a different FM carrier frequency, wherein said one applied phase shift determines which FM carrier frequency is demodulated by said FM demodulator.

17. Apparatus for selecting, demodulating and remodulating a signal from within a broadcast containing a video signal and two or more accompanying signals, said apparatus comprising:

means for selecting one of said two or more accompanying signals to produce a selected signal;

means for demodulating said selected signal;

means for frequency modulating said demodulated signal to produce a remodulated signal in the frequency spectrum of said broadcast; and means for combining said remodulated signal with said video signal and at least one other of said two or more accompanying signals which was not demodulated.

18. The apparatus of claim 17, wherein said means for selecting and said means for demodulating are controlled by a microprocessor.

19. The apparatus of claim 17, wherein said means for frequency modulating said selected signal places said demodulated signal in a downwardly shifted frequency spectrum from its original spectrum within said broadcast.

20. The apparatus of claim 17, wherein said two or more accompanying signals are frequency modulated onto two or more separate carrier frequencies, respectively.

21. The apparatus of claim 20, further comprising means for amplifying, prior to being combined by said combining means, one of said two or more accompanying signals which was not selected.

22. The apparatus of claim 20, wherein said means for demodulating comprises an FM demodulator and a varactor diode circuit for aligning a frequency of said FM demodulator with said selected signal.

23. The apparatus of claim 22, wherein said selecting means and said varactor diode circuit are simultaneously controlled by a switch.

24. The apparatus of claim 22, further comprising loading means, coupled to said selecting means, for loading one of said accompanying signals which was not selected at an impedance level which matches that of said demodulation means.

25. A circuit for selectively demodulating a television signal comprising a video signal and first and second sound signals, said circuit comprising:

a tuner for tuning to said television signal;

an intercarrier demodulator, coupled to said tuner, for demodulating said tuned television signal to provide an intercarrier sound signal including said first and second sound signals;

a first bandpass filter, coupled to said intercarrier demodulator and tuned to a first passband including said first sound signal, for filtering said intercarrier sound signal and outputting a first filtered sound signal through a first bandpass filter output;

a second bandpass filter, coupled to said intercarrier demodulator and tuned to a second passband including said second sound signal, for filtering said intercarrier sound signal and outputting a second filtered sound signal through a second bandpass filter output;

an FM demodulator for demodulating one of said first and second filtered sound signals to provide a demodulated sound signal;

a switch, coupled between said outputs of said first and second bandpass filters and said FM demodulator, for selecting one of said first and second filtered sound signals and providing said selected one to said FM demodulator;

means for tuning said FM demodulator in accordance with said selected signal to thereby selectively tune said FM demodulator to said first or second filtered sound signal;

a modulator, coupled to said FM demodulator, for remodulating said demodulated sound signal to produce a remodulated sound signal; and means for mixing said remodulated sound signal with said second filtered sound signal and said video signal.

26. The circuit of claim 25, further comprising a microprocessor, coupled to said switch and to said means for tuning said FM demodulator, said microprocessor for controlling said switch and said means for tuning in accordance with a subscriber-supplied signal.

27. The circuit of claim 26, further comprising a volume control circuit, connected between said FM demodulator and said modulator, for controlling a volume level of said demodulated signal.

28. The circuit of claim 25, wherein said means for tuning said FM demodulator comprises a tunable phase shifting circuit comprising a varactor diode, wherein a voltage applied to said varactor diode is used for shifting the phase.

29. A circuit for frequency demodulating a frequency modulated signal, comprising:

a frequency modulation demodulator having an input for accepting the frequency modulated signal, an output for providing a demodulated signal, and means for controlling said demodulator to change a tuned frequency of said demodulator by applying one of two predetermined fixed phase shifts to said frequency modulated signal, each of said predetermined fixed phase shifts corresponding to a different FM carrier frequency, wherein said applied one predetermined fixed phase shift determines which FM carrier frequency is demodulated;

a tank circuit, coupled to said means for controlling said demodulator, comprising an inductor and a capacitor, said tank circuit establishing said tuned frequency; and a varactor diode, coupled to said tank circuit and responsive to a selectable control voltage having one of a plurality of fixed voltage levels, for changing said tuned frequency in accordance with said selectable control voltage.

30. The circuit of claim 29, further comprising voltage supplying means for supplying said selectable DC control voltage to said varactor diode.

31. The circuit of claim 30, wherein said voltage supplying means comprises a microprocessor for establishing said selectable control voltage.

* * * * *